April 16, 1935.　　　F. V. WALTZ　　　1,997,842
VALVE ACTUATING MECHANISM
Filed Aug. 31, 1931　　　3 Sheets-Sheet 1
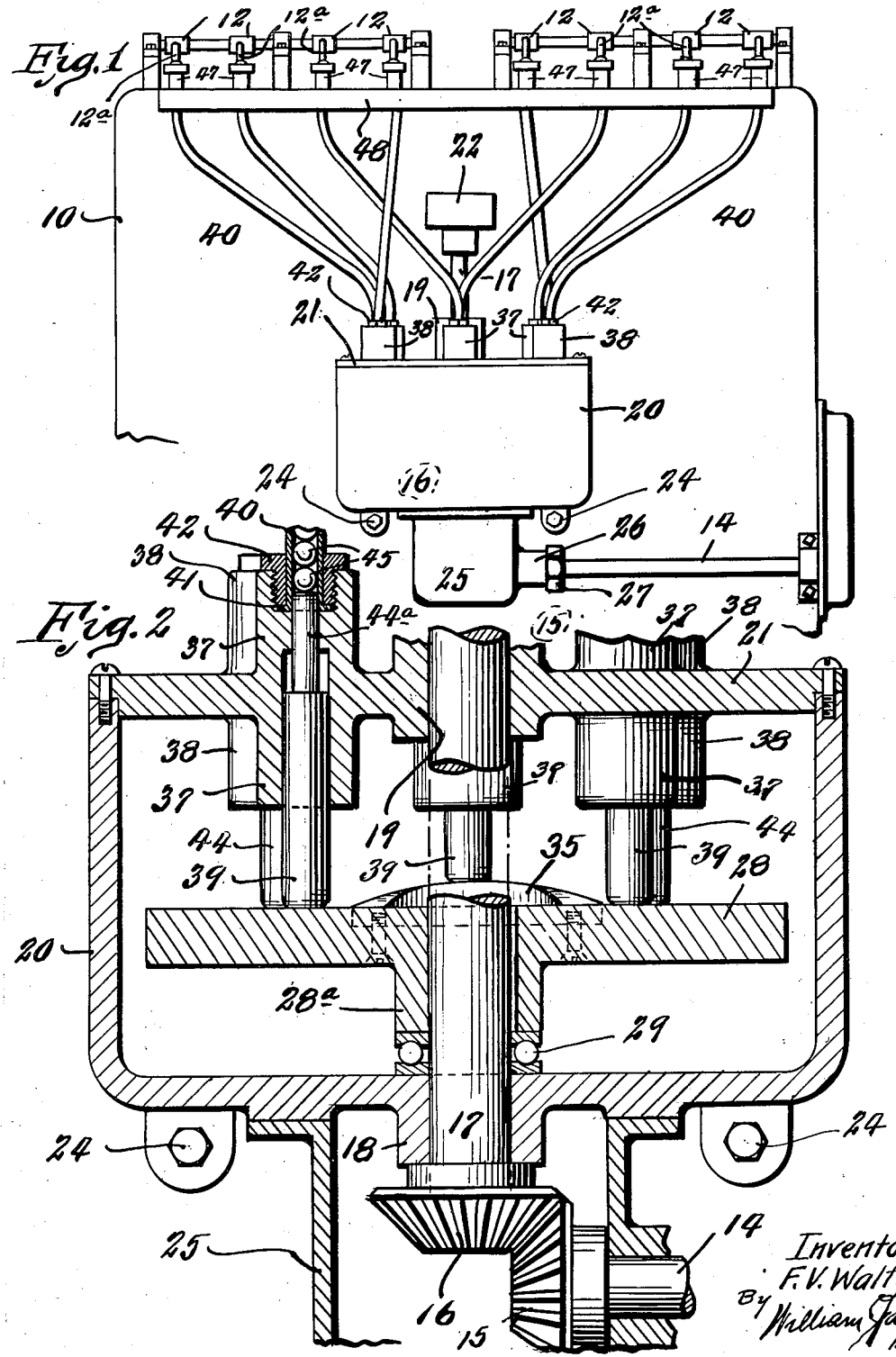
Inventor
F. V. Waltz
By William James
Atty April 16, 1935.  F. V. WALTZ  1,997,842
VALVE ACTUATING MECHANISM
Filed Aug. 31, 1931   3 Sheets-Sheet 2
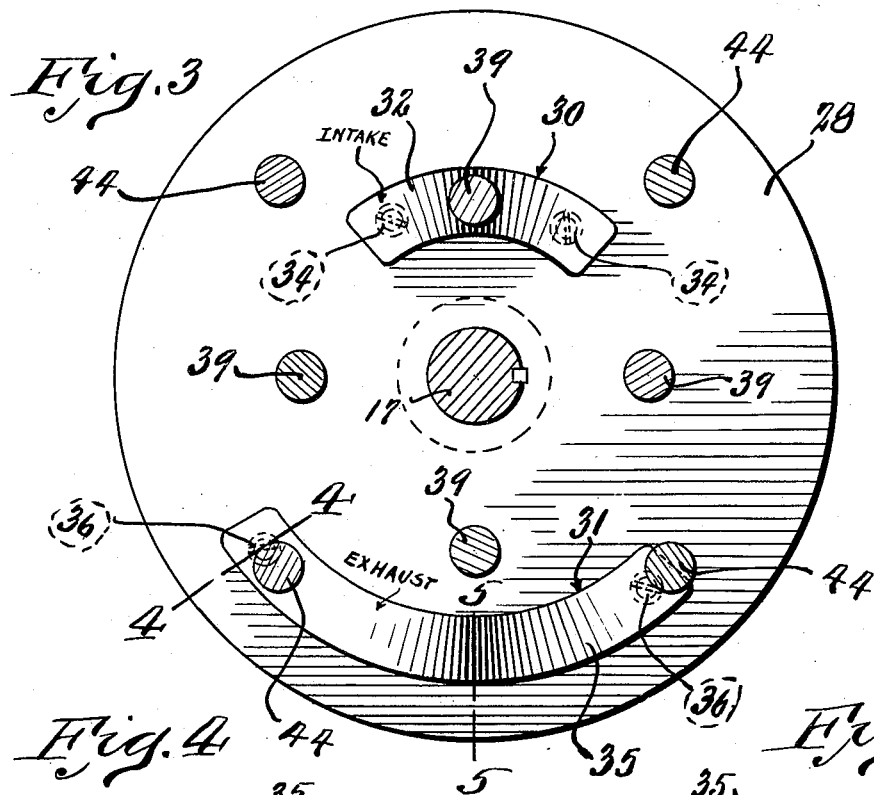
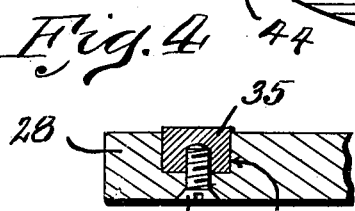
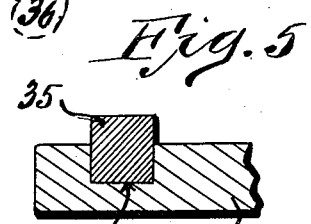
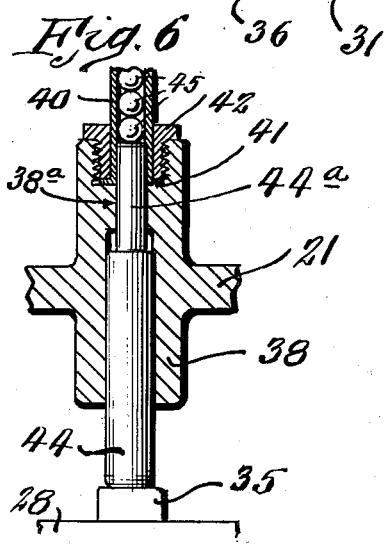
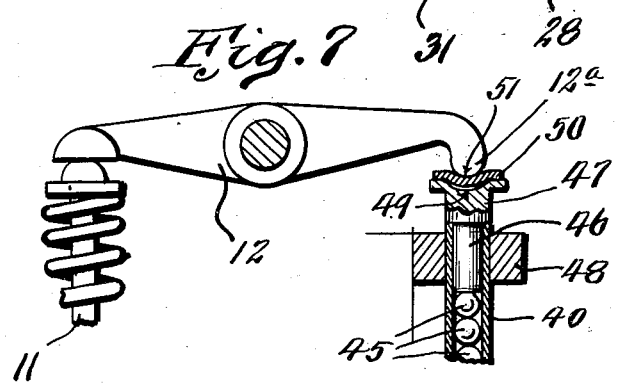

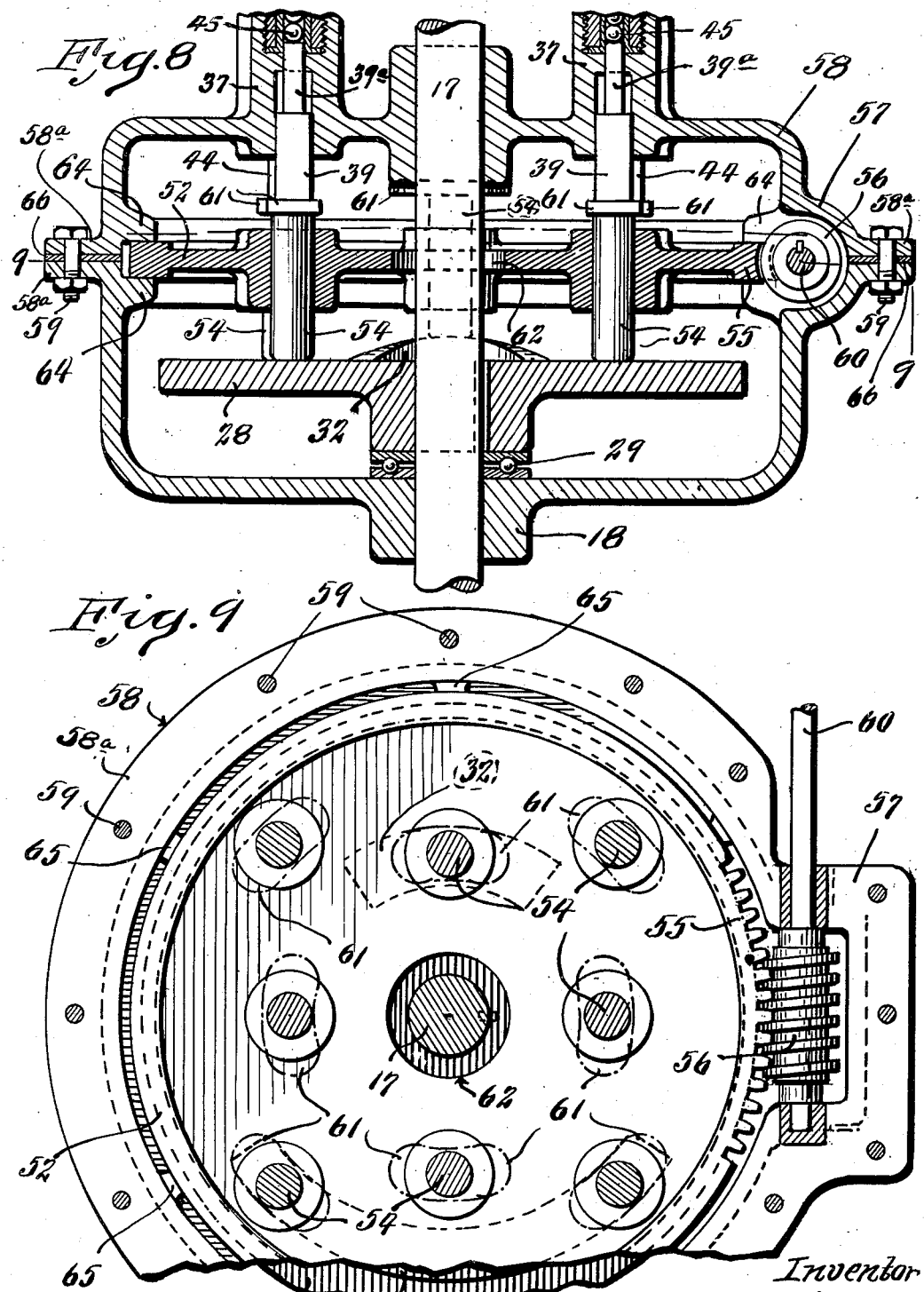

Patented Apr. 16, 1935

1,997,842

UNITED STATES PATENT OFFICE 1,997,842

VALVE ACTUATING MECHANISM

Foster V. Waltz, St. Louis, Mo.

Application August 31, 1931, Serial No. 560,319

6 Claims. (Cl. 123—90)

This invention relates generally to internal combustion engines and more particularly to valve actuating mechanism therefor.

As is well known in the art, the type of engine now commonly used has a horizontally disposed cam shaft extending the full length of the engine and having fixed thereon a plurality of cams, the number of the latter corresponding to the number of valves used. Each cam actuates a push rod which in turn operates a valve stem or a rocker arm as the case may be. Each cam has to be accurately machined to insure efficient operation and timing of the valves. As each cylinder of the engine of the four cycle type employs at least two valves (intake and exhaust) a four cylinder automobile engine, for instance, employs a cam shaft having eight cams and requires eight sets of push rods and other operating parts associated therewith.

One of the objects of the present invention is to provide an improved valve operating mechanism which is of compact and rugged construction, is light in weight and contains but few parts and which is so constructed that it can be manufactured and maintained at low cost.

Other objects of the invention are to provide an improved valve actuating mechanism having a cam member in the form of a horizontally disposed revoluble disk provided on its upper face with two upwardly presented cam portions disposed on different radii of the axis of said disks, one of said cam portions being used to operate the intake valve and the other to operate the exhaust valve of the engine by means of novel motion transmitting means arranged above said disk and in operative engagement with the respective valves and cam portions.

Still other objects of the invention are to provide a valve actuating mechanism wherein the cam portions are carried by a revoluble disk, the latter being so arranged that it can be operated from the generator shaft of the engine.

Further objects of the invention are to provide a reciprocating motion transmitting means between the cam member and the valve, said means comprising a tubular stationary member and a plurality of balls arranged in said tubular member in juxtaposed relation with each other, the terminal balls being in operative engagement with rods slidably mounted in the ends of said container and operatively associated with the respective valve and said cam disk.

Still further objects of the invention are to provide a revoluble disk having one or more cam portions detachably secured thereto whereby such cam portions can be replaced when worn.

Additional objects of the invention are to provide an operating connection between two spaced points, such operating connection comprising a tubular member which can be curved in any desired shape, a plurality of balls loosely arranged in said tubular member in juxtaposed relation with each other, and sliding rods mounted in the respective ends of said tubular member and in operative contact with the respective balls whereby reciprocating motion can be transmitted along irregular lines.

With these and other objects in view, my invention consists in certain novel features of construction and arrangement of parts, hereinafter more fully described and claimed, and illustrated in the accompanying drawings, in which—

Figure 1 is a side elevational view of an automobile engine equipped with my improved valve actuating mechanism.

Figure 2 is a vertical cross section taken through the housing of my actuating mechanism and showing the latter in cross section.

Figure 3 is a top plan view of the cam disk and showing in cross section the rods of the lower ends of my improved reciprocating motion transmitting means.

Figure 4 is an enlarged fragmental cross section taken on line 4—4 of Figure 3.

Figure 5 is an enlarged fragmental cross section taken on line 5—5 of Figure 3.

Figure 6 is an enlarged detail cross section taken on line 6—6 of Figure 1.

Figure 7 is a detail view of the valve mechanism.

Figure 8 is a vertical cross section through a modified form of my invention wherein means are shown for advancing or retarding the valve actuating mechanism, Figure 9 is a horizontal cross section taken on line 9—9 of Figure 8.

Referring by numerals to the accompanying drawings, 10 indicates an automobile internal combustion engine of a well-known type having valves 11 and rocker arms 12. 14 indicates a shaft, such as the generator shaft of an automobile engine, one end of which is geared in the usual manner to the crank shaft while the other end has fixed thereon a beveled gear 15 which meshes with a beveled gear 16. The latter is fixed to the lower end of a vertically disposed shaft 17. This shaft is mounted in bearings 18 and 19. Bearing 18 is formed in the bottom wall of a housing 20 and bearing 19 is formed in the cover 21 detachably closing the top of said housing. Shaft 17 extends upwardly above housing 20 a suitable distance and has mounted thereon a spark timing mechanism 22. Housing 20 is preferably fixed to the cylinder block, as indicated at 24. Gears 15 and 16 are enclosed by a casing 25 which is secured to and depends from the bottom wall of housing 20. This casing is provided with a horizontally disposed bearing 26 through which shaft 14 operates. A packing gland 27 is secured to the outer end of bearing 26 and provides a seal which prevents oil contained in said casing from escaping through.

A disk 28 is fixed to shaft 17 within housing 20 and a thrust bearing 29 is interposed between the downwardly presented hub 28a of said disk 28 and the bottom wall of housing 20 so as to reduce friction to minimum when shaft and disk 28 are in operation. The upper end of this disk is provided with a pair of arcuate pockets 30 and 31 which are preferably spaced diametrically from each other and are arranged on different radii from the axis of shaft 17. Pocket 30 receives an intake cam portion 32 which is secured therein by screws 34. Pocket 31 receives an exhaust cam portion 35 which is secured in position by screws 36.

Cover 21 is provided with a plurality of vertically disposed spaced bearings 37 and 38. Bearings 37, of which there are four, are spaced equidistant from each other and from the axis of shaft 17 and are arranged on radii which correspond to the radius of the intake cam portion 32. Bearings 38 are also spaced equidistant from each other and from the axis of shaft 17 and about 45 degrees from the bearings 37 and are arranged on radii corresponding to the radius of the exhaust cam portion 55.

Bearings 37 and 38 extend a suitable distance into housing 20 and slidably mounted in bearings 37 are rods 39. The lower end of each rod 39 bears on the upper face of disk 28 and the upper end of said rod is reduced as indicated at 39a and operates through a reduced bore 37a in bearing 37 and extends into the lower end of a tubular member 40. This lower end is provided with a flange 41 and is received in the internally threaded bore formed in the upper end of bearing 37. A gland 42 is screw-seated in the threaded upper end of bearing 37 and serves to secure said flanged end 41 in position.

Bearings 38 have slidably mounted therein rods 44, the lower ends of which project downwardly from said bearings and rest on the upper face of cam disk 28 and are adapted to be engaged by the cam portion 35. The upper ends of bearings 38 receive the lower ends of tubular members 40 in the same manner as bearings 37 and the upper ends 44a of rods 44 extend into the lower ends of said tubular members and operate in identically the same manner as rods 39.

Rods 39 are associated with the intake valves and are adapted to be engaged by intake cam 32, while rods 44 are associated with exhaust valves and are adapted to be engaged by exhaust cam 35. Cams 32 and 35 are so proportioned as to effect accurate opening and closing of the respective valves. Said cams are formed arcuate, concentric with the axis of rotation of cam disk 28, and in the present case the intake cam 32 is spaced inwardly from the exhaust cam 35. Similarly the intake rods 39 are located inwardly of the exhaust rods 44. Thus each end of the rod is operated upon by the respective cam portion and there is no interference between them. This spacing of rods 39 and 44 and the corresponding cams insure proper time sequence in the operation of the valves of the engine.

The cams are case-hardened to resist wear and they can be readily replaced when worn. The use of a cam revoluble in a horizontal plane instead of in a vertical plane eliminates sudden impacts or hammer blows of the cam upon the push rod, thereby preventing noise and providing more accurate operation of the rods.

The reciprocating motion or power is transmitted from each push rod 39 and 44 to the respective rocker arms 12 by means of a plurality of steel balls 45 which are arranged in each tubular member 40 in a single row and completely fill the latter. The lowermost ball bears against the upper end of reduced portion 39a or 44a and the uppermost ball bears against the lower reduced end 46 of a rod 47, which reduced end projects into said tubular member. Each of these rods 47 is slidably mounted in the upper end of the respective tubular member and these upper ends are secured in position on the engine by a clamping bar 48. This clamping bar can be made in a single piece as shown in the drawings, or it may be in short lengths so as to clamp the upper ends of each pair of adjacent tubular members. Said bar is secured to the engine block and supports said tubular members in proper position, maintaining rods 47 in vertical planes with the respective rocker arms 12.

The upper end of each rod 47 is preferably formed concave, as indicated at 49, and resting on each upper end is a plate 50 which is shaped to fit loosely against said upper end and to form an upwardly presented concave seat 51 which is engaged by the downwardly presented end 12a of rocker arm 12. The purpose of this plate is to provide contact between member 12a and the upper end of rod 47 and preserve the latter in true vertical position. Plate 50 is permitted slight lateral motion on the upper end of rod 47 and takes up the wiping contact produced by the movement of the rocker arm so that said rod 47 is not affected.

In the modified form shown in Figures 8 and 9, means are shown for advancing the action of the valve mechanism. In this form an intermediate disk 52 is provided carrying plungers 54 which latter are interposed between the rods 39 and 44 and the cam disk 28. As the cam disk revolves, the cam portions actuate the respective plungers, which in turn operate the rods. The intermediate disk is partially rotatable to advance or retard the plungers 54 relatively to the movement of the cam portion. Thus when the intermediate disk 52 is moved in a direction opposite to that of the cam disk, the operation of the valve mechanism is advanced while if the intermediate disk is partially rotated in the direction in which the cam disk operates, the operation of the valve mechanism will be retarded. The intermediate disk can be operated in any convenient manner, either manually or automatically, or both. As shown herein, this intermediate disk is provided with a segmental worm gear portion 55 which meshes with a worm 56 journaled in extension 57 of casing 58. The latter is preferably formed in two sections bolted together as indicated at 59 to facilitate the assemblage of the mechanism. The worm 56 is fixed on a shaft 60 which extends outwardly from said casing and is connected to a suitable actuating mechanism, not shown.

As stated before, this actuating mechanism can be either automatic or manual, or the two can be combined.

Preferably the lower ends of rods 39 and 44 are provided with horizontal arcuate enlargements 61 which are arranged concentrically with the axis of rotation. This permits the adjusting movement of the plungers 54 relatively to said rods without interfering with the operative connection therebetween.

Thus the plungers 54 can be moved to one side of rods 39 and 44 interrupting the operative relationship. Adjusting or intermediate disk 52 is provided with a central opening 62 through which shaft 17 extends upwardly. This disk is preferably held in position by circular flanges 64 which are formed integral with and project inwardly from the annular walls of the two halves of casing 58. When the two sections or halves of said casing are clamped together a clearance exists between the upper flange 64 and the upper face of said disk so that the latter is free to operate.

In order to reduce friction, said disk 52 is preferably spaced from said sections as shown in the drawings, and spaced ribs 65 formed integral with the lower section are used to maintain disk 52 in proper central position. A gasket 66 is interposed between flanges 58a of the sections of casing 52 so as to provide a seal for the casing when the latter is filled with oil. As the casing (25 or 52) is completely filled with oil, the operating mechanism contained therein is amply lubricated so that very little wear takes place. When the shaft 14 leaves the casing a seal 27 is provided to prevent escape of the oil from the casing.

The balls 45 are lubricated by oil admitted into each tubular member 40 through both ends thereof. The use of balls 45 permits direct operative connection between the actuating member and the actuated member along a curved or irregular line without the use of any intermediate mechanism. This not only amplifies the construction of the valve actuating mechanism but also reduces the manufacturing as well as the operating costs and provides a more accurate and silent operation.

My invention can be applied to any type of engine employing tappet valves.

While I have shown and described herein the preferred form of my invention, it is to be understood that various changes in the construction and arrangement of parts of my improved valve actuating mechanism can be made and substituted for those herein disclosed without departing from the spirit of my invention.

I claim:

1. In a valve actuating mechanism of the class described, the combination with valve actuating members, of a revoluble horizontally disposed disk provided on one face with one or more cam portions, an adjusting disk rotatably mounted in spaced relation with the cam face of the first disk, a plurality of plungers slidably mounted in said adjusting disk in spaced relation with each other and having one of their ends engageable by the respective cam portion, a plurality of tubular members stationarily mounted and extending along curved lines from each plunger adjacent to the corresponding valve actuating member, a set of intermediate plungers slidably mounted each in each tubular member adjacent to and in operative engagement with the corresponding slidable plungers whereby the actuation of the respective cam portion and of the slidable plunger imparts slidable motion to the corresponding intermediate plunger, and balls arranged in a single row in each tubular member and having their outermost balls in operative engagement with the respective intermediate plunger and valve actuating member, thereby transmitting motion from said intermediate plunger to said valve actuating member, said adjusting disk being adjustable rotatably to shift said slidable plungers relatively to said cam portions and retard or accelerate the operative engagement therebetween.

2. In a device of the class described, the combination with valve actuating members, of a revoluble horizontally disposed disk provided on one face with spaced cam portions, an adjusting disk rotatably mounted in spaced axial relation with the cam face of said first disk, a plurality of plungers slidably mounted in said adjusting disk and having one of their ends engageable by the respective cam portions, a plurality of tubular members stationarily mounted and extending from each slidable plunger adjacent to the corresponding valve actuating member, a set of intermediate plungers slidably mounted each in each tubular member adjacent to and in operative engagement with the corresponding slidable plunger whereby said intermediate plungers are actuated by said slidable plungers, a slidable rod mounted in the outer end of each tubular member and in operative engagement with the corresponding valve actuating member, and a plurality of balls arranged in a single row in each tubular member and having their outermost balls in operative contact with the corresponding intermediate plunger and rod, said adjusting disk being adjustable on its axis to shift the plungers mounted therein relatively to said cam portions and accelerate or retard the operative engagement therebetween, the outer end of each slidable plunger being provided with an enlarged surface so as to retain at all times operative engagement with the corresponding intermediate plunger.

3. In a device of the class described, the combination of a housing adapted to be mounted adjacent to one side of an engine block, a vertically disposed shaft journaled therein, means for actuating said shaft from said engine, a horizontally disposed disk fixed to said shaft within said housing, a pair of cam portions arranged on the upper face thereof, an adjusting disk rotatably mounted in said housing in axial spaced relation with the cam face of said disk, a set of primary plungers vertically mounted in said adjusting disk and having their lower ends adapted to be engaged by said cam portions, a set of intermediate plungers slidably mounted in said housing above said adjusting disk and having their lower ends engaging the upper ends of said primary plungers, a plurality of tubular members each having one of its ends anchored in said housing in coaxial relation with the outer end of the corresponding intermediate plunger and extending from said housing and having its outer end adapted to be anchored adjacent to the respective valve actuating member, a plurality of balls arranged in a single row in each tubular member and having their outermost balls in operative engagement with the corresponding intermediate plunger and the valve actuating member whereby reciprocating motion is transmitted from said cam disk by means of said balls along curved lines, and means arranged in said housing for operating said adjusting disk.

4. In a device of the class described, the combination with a plurality of valve actuating members, of a revoluble disk provided on one face with a plurality of cam portions, an adjusting disk coaxially arranged with the first disk in spaced-apart relation with the cam face thereof, and revoluble independently of said first disk, a plurality of plungers slidably mounted in said adjusting disk, each plunger having one of its ends engageable by said cam portions, a plurality of stationary tubular members extending each from a point above each plunger along a curved line to a point adjacent to the respective valve actuating member, an intermediate plunger mounted in one end of each tubular member adjacent to and in operative engagement with the corresponding first-mentioned plunger, and a plurality of balls arranged in a single row in each tubular member and completely filling the same, the outermost balls of each tubular member being in operative engagement with the respective intermediate plunger and the valve actuating member, whereby the motion of each cam actuated plunger is transmitted through the corresponding intermediate plunger and the row of balls associated therewith to the respective valve actuating member, said adjusting disk being adjustable about its axis to shift the first-mentioned set of plungers relatively to said cam portions and retard or accelerate the operative engagement therebetween.

5. In a device of the class described, the combination with a plurality of valve actuating members, of a revoluble cam disk disposed on a horizontal plane below said valve actuating members, a plurality of upwardly projecting cam portions arranged in spaced-apart relation on the upper face of said cam disk, a plurality of tubular members extending upwardly from said disk to said valve actuating members, the lower end of each tubular member terminating above and adjacent to the cam face of said disk and in predetermined spaced relation with the cam portions thereof and the upper end of each tubular member being disposed adjacent to the corresponding valve actuating member, a plunger having its upper end slidably mounted in the lower end of each tubular member and having its lower end engaging the cam face of said disk and the cam portions thereof, a plunger having one end slidably mounted in the upper end of each tubular member and having its other end operatively engaging the corresponding valve actuating member, and a plurality of steel balls operatively filling in a single row each tubular member, the outermost balls engaging, respectively, the upper end of said cam actuated plunger and the inner end of said upper plunger whereby the motion imparted by said cam portions to the lower portion is transmitted by said balls to the upper plunger for actuating said valve actuating members.

6. In a device of the class described, the combination with a valve actuating member, of an open-topped housing, a cover therefor, a vertically disposed shaft journaled in said housing and said cover, a horizontally disposed disk fixed on said shaft within said housing, means for driving said shaft, a pair of upwardly projecting cams arranged on the upper face of said disk in spaced-apart relation with each other, a plurality of vertically disposed bearings formed in said cover, a vertically disposed slidable plunger mounted in each bearing and having its lower end projecting into said housing and engaging the cam face of said disk, a plurality of tubular members, means for securing the lower end of each tubular member to the upper end of each bearing whereby the upper end of each plunger enters the lower end of the corresponding tubular member, means for anchoring the upper end of each tubular member adjacent to the corresponding valve actuating member, a vertically slidable plunger mounted in the upper end of each tubular member and having its upper end operatively associated with the valve actuated member, and a plurality of steel balls arranged in a single row within said tubular member throughout its entire length and having its lowermost ball engaging the upper end of said cam actuated plunger and having its uppermost ball engaging the lower end of said upper plunger whereby said valve actuating members are operated by the actuation of said cam disk through the medium of the corresponding plungers and the rows of balls contained in the respective tubular members.

FOSTER V. WALTZ.